H. A. SCHMIDT.
ELECTRIC CURRENT GENERATOR.
APPLICATION FILED JAN. 31, 1910.

971,690.

Patented Oct. 4, 1910.

Witnesses
R. A. White
H. P. Leblite

Inventor
Herman A. Schmidt
By Toree Bain and May
Attys

UNITED STATES PATENT OFFICE.

HERMAN A. SCHMIDT, OF CHICAGO, ILLINOIS.

ELECTRIC-CURRENT GENERATOR.

971,690. Specification of Letters Patent. Patented Oct. 4, 1910.

Application filed January 31, 1910. Serial No. 541,097.

*To all whom it may concern:*

Be it known that I, HERMAN A. SCHMIDT, a citizen of the United States, residing at Chicago, in the county of Cook and State of Illinois, have invented certain new and useful Improvements in Electric-Current Generators, of which the following is a specification.

My invention relates to electric current generators and has for its general object to provide a miniature generator, manually operable to generate current for the excitation of electric bells and the like, constructed to operate efficiently for the production of a ringing current upon a slight movement of the prime mover or handle, and of general structure adapting it practically for the purpose described and for easy installation under varying environments as a door-bell generator or the like.

Further objects of my invention are to provide such a hand generator of very small compass, strong in construction, of small number of parts, susceptible of manufacture with interchangeable parts, easily assembled, and low in cost.

Figure 1:
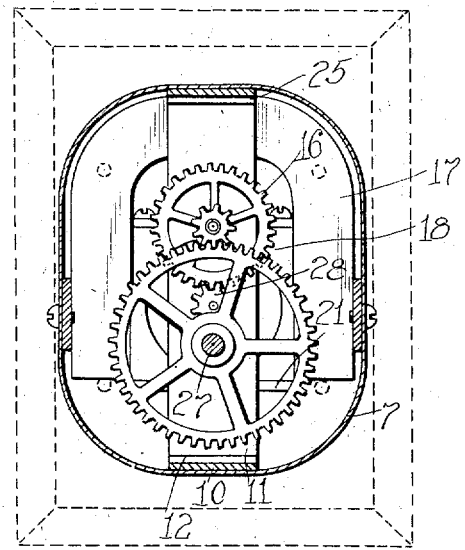
Figure 2:
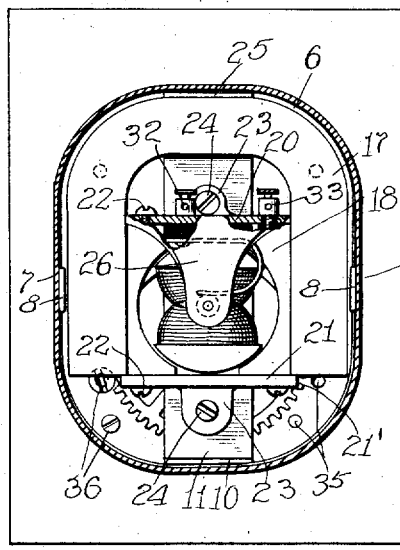
Figure 3:
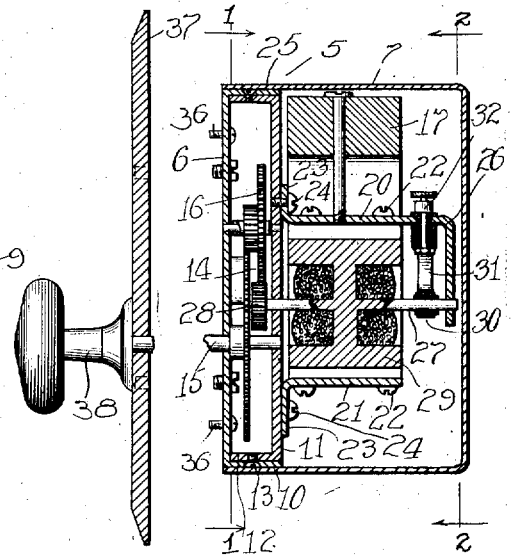

In the drawings, Figure 1 is a vertical section on line 1—1 of Fig. 3; Fig. 2 is a similar section on line 2—2 of Fig. 3; Fig. 3 is a central vertical section.

In the embodiment of my invention shown in the drawings, I provide a two-piece casing, generally indicated at 5, comprising a front, supporting base plate, 6, of sheet metal, and a thin sheet metal cap or cover, 7, which, with the base plate, completely incloses a chamber for the operating parts. For securing the cap 7 upon the base plate 6, said base plate is provided with side ears, 8, to which the cap is secured by screws, 9. The base plate has at its top and bottom inwardly bent lugs, 10, to which is secured a yoke, 11, having oppositely bent extremities, 12, secured to the lugs 10, as by screws, 13. The base plate and yoke form a supporting frame for a multiplying gear comprising a train of suitable gear wheels having their arbors or shafts journaled in the base and yoke and adapted to transmit motion from a power shaft, 15, to a gear wheel, 16. The yoke 11 affords support to the generating devices proper, which are shown in the particular construction as follows: 17 indicates a permanent horse-shoe magnet having associated with its parallel extremities confronting pole pieces, 18, preferably separate and detachable from the magnet proper and shaped to include between them a cylindrical armature space. Above and below the pole pieces 18 are diamagnetic bridge plates, 20 and 21, secured to the two pole pieces as by screws, 22, and each plate having projecting from its base end an ear, 23, secured to the yoke plate, as by a screw, 24. The lower plate 21 projects, as at 21', beyond the sides of the pole pieces so as to receive and support the extremities of the permanent magnet 17, which is further secured in position by a screw, 25, extending down through the yoke of the horse-shoe magnet and engaging in a suitable threaded aperture in the upper plate 20. One of said plates, preferably the upper plate 20, has extending therefrom a bearing standard, 26, affording support to one extremity of the armature shaft 27, the opposite extremity of which is supported in the yoke 11. Upon the end of the armature shaft 27 is mounted a pinion, 28, which meshes with the gear member, 16 of the multiplying train, so that slow rotation of the power shaft 15 will be transformed into rapid rotation of the armature shaft 27. The armature shaft carries a suitable armature, 29, having one end of its winding connected to the shaft or "grounded" and its opposite terminal connected to an insulated collecting ring, 30, upon the shaft between the armature and its standard 26, said collecting ring having bearing thereon an insulated spring, 31, to which connection of one of the exterior wires may be made through an appropriate binding post, 32, while connection of another exterior wire may be made through another binding post, 33, grounded on the frame.

The base plate 6 of the casing is provided with suitable apertures, 35, for the reception of screws, 36, whereby the casing may be secured to any desired support; and in the commercial practice of my invention, I customarily provide in connection with the apparatus a suitably finished escutcheon plate, 37, provided with threaded apertures to receive said screws and with an aperture for the power shaft 15. Also, in commercial practice, I provide a power shaft 15 of considerable length, preferably about ten inches, and a handle, 38, which may be driven or soldered onto said shaft, in order that the device may be applicable in widely varying environment, the long shaft being suitable for extension through a thick door frame, and the shaft being cut off to appropriate length when the generator is installed in a situation where the operating handle 38 will not be so far removed from the casing.

It will be seen that rotation of the operating handle will rotate the armature and thereby cause the generation of current; and in practice it is necessary only to give the generator handle a turn through an angle of a few degrees to operate an alternating current bell. The generator construction described is small and compact, largely constructed of sheet metal parts as to its framing and the like, and is advantageous in its strength, cheapness, lightness, ease of assemblage, and durability. It will be noted that the reduction gear is wholly supported in the frame provided by the base and yoke, and the permanent-magnet parts are interconnected by the framing bridges, with the armature supported between said frames, so that the structure may easily be disassembled to get access to the armature or to the gearing parts.

While I have herein described an embodiment of my invention in some detail it will be apparent to those skilled in the art that changes in the details of construction might be made without departure from the spirit and scope of my invention and within the scope of the appended claims.

What I claim is:

1. In a miniature generator providing a base for attachment to a support, multiplying gearing mounted on said base, means for imparting motion to said gearing, a permanent magnet having confronting polar projections arranged to constitute a field, diamagnetic plates bridging the polar projections above and below the field area and supported from the base, and an armature operatively associated with said multiplying gearing and arranged within the field.

2. In a miniature generator, a horse-shoe magnet having polar projections to provide a field, a diamagnetic bridge secured to said polar projections and carrying a bearing standard an armature within the field provided with a shaft mounted in said standard, a pinion on said shaft, multiplying gearing connected with said pinion, a frame for said gearing connected to support the diamagnetic bridge and means for communicating power to said gearing.

3. In a miniature generator, a casing, providing a front plate and a cover; a yoke, supported by said plate; multiplying gearing in the space between the yoke and plate; a permanent horse-shoe magnet, having confronting polar projections; bridge plates above and below said projections supported by said yoke, one of said bridge plates having a bearing extension; an armature shaft supported between said extension and the yoke, and operatively associated with the multiplying gearing; current collecting means associated with said armature; and means for imparting power to said gearing.

In testimony whereof I hereunto set my hand in the presence of two witnesses.

HERMAN A. SCHMIDT.

In the presence of—
W. LINN ALLEN,
MARY F. ALLEN.